(12) United States Patent
Yamashita

(10) Patent No.: US 7,168,681 B2
(45) Date of Patent: Jan. 30, 2007

(54) FUEL INJECTION VALVE HAVING SMALL SIZED STRUCTURE

(75) Inventor: Yoshinori Yamashita, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/189,925

(22) Filed: Jul. 27, 2005

(65) Prior Publication Data

US 2006/0022161 A1     Feb. 2, 2006

(30) Foreign Application Priority Data

Jul. 29, 2004  (JP) .............................. 2004-222205
Jun. 23, 2005  (JP) .............................. 2005-183320

(51) Int. Cl.
*F16K 31/02* (2006.01)
(52) U.S. Cl. ................................. 251/129.21
(58) Field of Classification Search .......... 251/129.21, 251/129.15; 335/299
See application file for complete search history.

(56) References Cited

U.S. PATENT DOCUMENTS

| | | | |
|---|---|---|---|
| 4,288,657 A * | 9/1981 | Swanson ..................... 174/87 |
| 4,988,055 A * | 1/1991 | Sakai et al. .................. 242/159 |
| 5,494,224 A * | 2/1996 | Hall et al. ................. 239/585.5 |
| 5,704,585 A * | 1/1998 | Hrytzak et al. ......... 251/129.01 |
| 5,918,818 A * | 7/1999 | Takeda ..................... 239/585.1 |
| 5,944,262 A * | 8/1999 | Akutagawa et al. ...... 239/585.4 |
| 6,060,973 A * | 5/2000 | Kawano et al. ............. 336/190 |
| 6,369,682 B1 * | 4/2002 | Thompson et al. ......... 336/192 |
| 6,682,046 B2 * | 1/2004 | Mimura et al. ......... 251/129.15 |
| 6,712,297 B1 | 3/2004 | Sugiyama et al. ....... 239/585.2 |
| 6,834,667 B2 * | 12/2004 | Sumiya et al. ......... 137/315.01 |

* cited by examiner

*Primary Examiner*—Justine R. Yu
*Assistant Examiner*—Andrew J Rost
(74) *Attorney, Agent, or Firm*—Nixon & Vanderhye PC

(57) ABSTRACT

A fuel injection valve includes a valve member, a movable core, a fixed core, and a coil. The valve member opens and closes a nozzle hole. The movable core reciprocates with the valve member in a substantially axial direction of the movable core. The fixed core is arranged on the side opposite to the nozzle hole with respect to the movable core. The fixed core opposes to the movable core. The coil generates magnetic force, which attracts the movable core toward the fixed core when the coil is energized. The coil includes a winding. The winding of the coil has an axial section, which is in a polygonal shape. The axial section of the winding is in a substantially oblong shape, in a substantially rectangular shape, or the like.

12 Claims, 6 Drawing Sheets

FIG. 10A
PRIOR ART
FIG. 10B
PRIOR ART
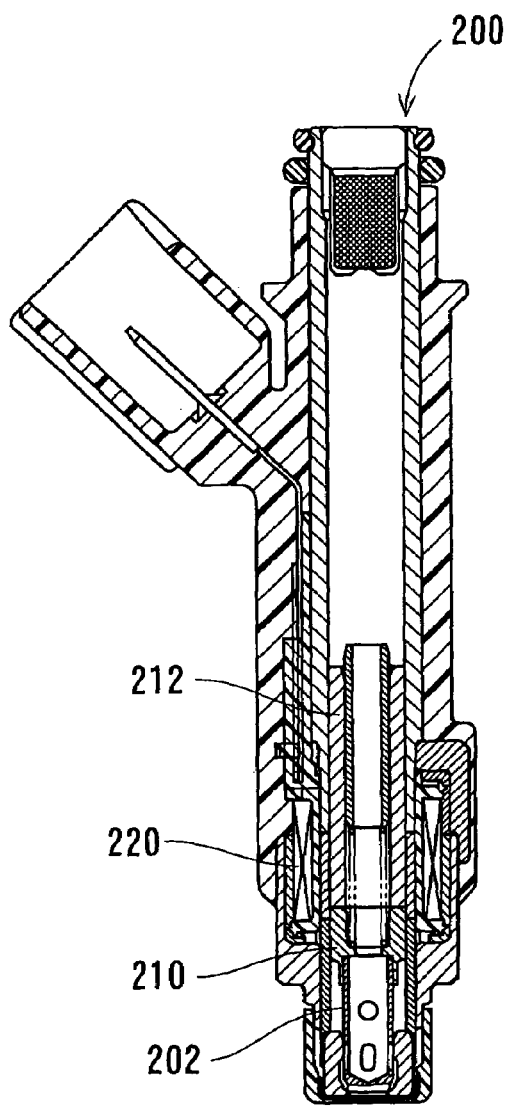
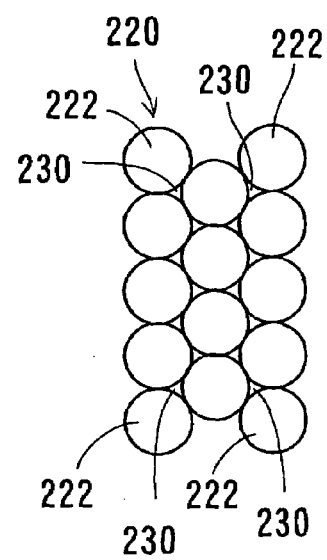

US 7,168,681 B2

FUEL INJECTION VALVE HAVING SMALL SIZED STRUCTURE

CROSS REFERENCE TO RELATED APPLICATIONS

This application is based on and incorporates herein by reference Japanese Patent Applications No. 2004-222205 filed on Jul. 29, 2004 and No. 2005-183320 filed on Jun. 23, 2005.

FIELD OF THE INVENTION

The present invention relates to a fuel injection valve for an internal combustion engine.

BACKGROUND OF THE INVENTION

In a conventional fuel injection valve, a coil is energized to generate magnetic force, so that a fixed core attracts a movable core. The movable core reciprocates with a valve member, so that the fuel injection valve intermittently injects fuel through a nozzle hole.

The fuel injection valve needs to accurately control an amount of fuel by enhancing responses in opening and closing the valve member even when the fuel injection valve injects a small amount of fuel.

For example, a fuel injection valve disclosed in U.S. Pat. No. 6,712,297B1 (JP-A-2002-48031) has a structure, which is similar to a structure of a fuel injection valve 200 shown in FIGS. 10A, 10B. The fuel injection valve 200 includes a coil 220 having a winding 222, which is substantially circular in cross section. When the circular cross sectional winding 222 is wound to construct the coil 220, wires of the winding 222, which are adjacent to each other, form a gap 230 therebetween. As a result, a space factor of the winding 222 decreases. Here, the space factor represents a rate of a space occupied by the winding with respect to a space in the coil. Therefore, when the space factor is low, the gaps formed in the winding 222 become large. When the inner diameter of the coil 220 is the same, and when the space factor decreases, one of the outer diameter and the axial length of the coil 220 increases. As a result, a magnetic path, through which magnetic flux generated using the coil 220, becomes large. In this case, the magnetic flux is apt to leak, and magnetic force may decrease. Accordingly, the movable core 210 and the valve member 202 may not be quickly attracted toward the fixed core 212. Thus, it is difficult to enhance the responses in opening and closing the valve member 202. In addition, the fuel injection valve 200 is hard to be small sized when the outer diameter and the axial length of the coil 220 increases.

SUMMARY OF THE INVENTION

In view of the foregoing and other problems, it is an object of the present invention to provide a small-sized fuel injection valve having an enhanced response in opening.

According to one aspect of the present invention, a fuel injection valve includes a valve member, a movable core, a fixed core, and a coil. The valve member opens and closes a nozzle hole. The movable core axially reciprocates with the valve member. The fixed core is arranged on a side opposite to the nozzle hole with respect to the movable core. The fixed core opposes to the movable core. The coil generates magnetic force, which attracts the movable core toward the fixed core when the coil is energized. The coil includes a winding. The winding of the coil has an axial section, which is in a polygonal shape.

In this winding structure, a gap formed between wires arranged to be adjacent to each other can be reduced, so that the space factor in the winding structure can be enhanced. Therefore, at least one of the outer diameter and the axial length of the coil can be reduced. Thus, a magnetic path, through which magnetic flux generated using the coil passes, becomes small, so that leakage of magnetic flux can be reduced. Besides, magnetic force, which attracts the movable core toward the fixed core, can be increased. Thus, response of opening the valve can be enhanced.

BRIEF DESCRIPTION OF THE DRAWINGS

The above and other objects, features and advantages of the present invention will become more apparent from the following detailed description made with reference to the accompanying drawings. In the drawings:

FIG. 10A is a cross sectional side view showing a fuel injection valve, and FIG. 10B is a schematic view showing a coil of the fuel injection valve, according to a prior art.

DETAILED DESCRIPTION OF PREFERRED EMBODIMENTS (First Embodiment)

Figure 1:
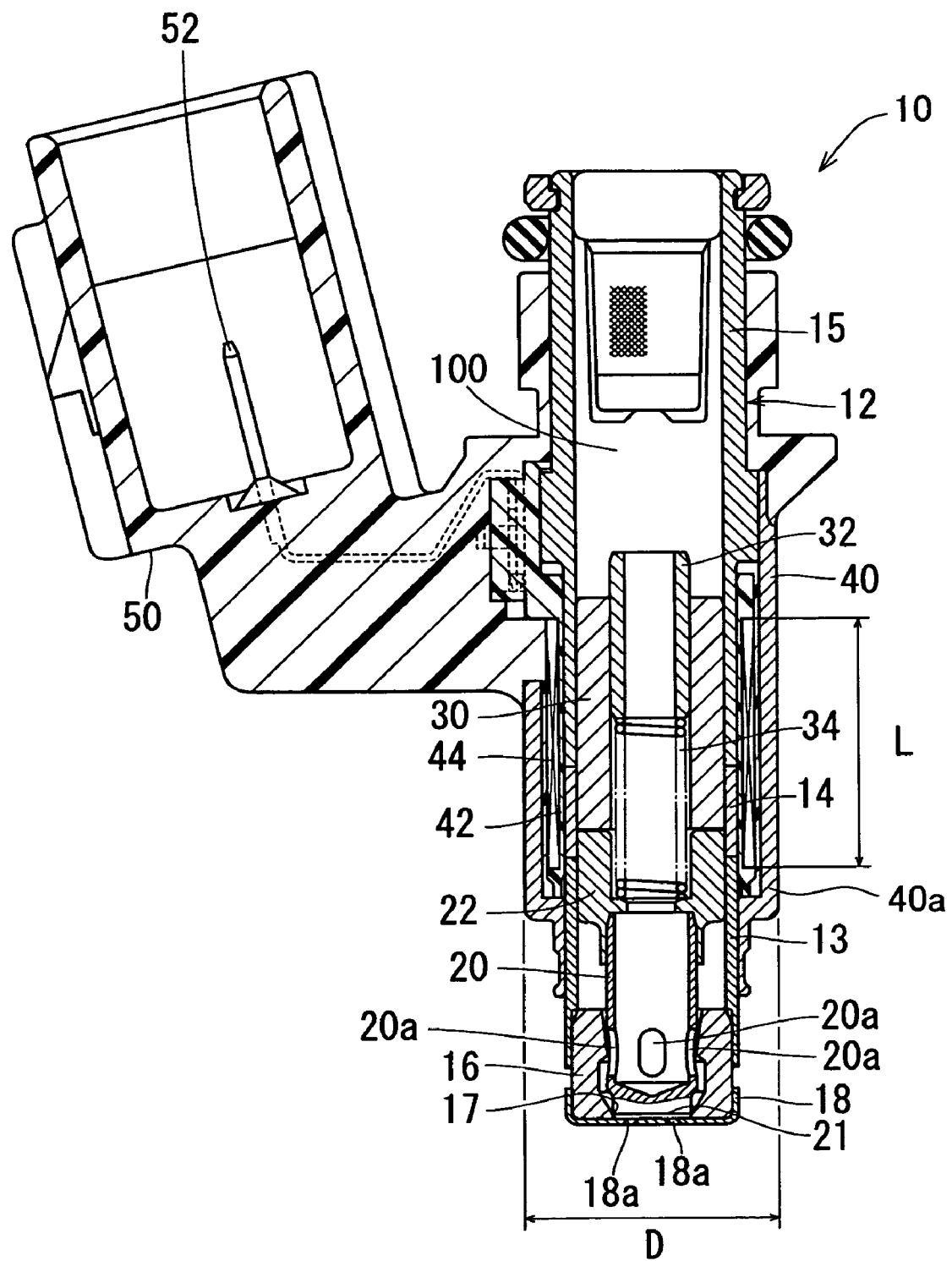
FIG. 1 is a cross sectional side view showing a fuel injection valve, according to a first embodiment of the present invention.

A fuel injection valve 10 shown in FIG. 1 is mounted to an internal combustion engine such as a gasoline engine. The fuel injection valve 10 includes a cylindrical member 12 that is formed to be in a substantially cylindrical shape. The cylindrical member 12 is constructed of a magnetic member and a non-magnetic member. The cylindrical member 12 defines a fuel passage 100 that accommodates components such as a valve body 16, a valve member 20, a movable core 22, a fixed core 30, an adjusting pipe 32, and a spring 34. The spring 34 serves as a biasing member. A fuel filter is provided to an inlet port of the cylindrical member 12.

The cylindrical member 12 includes a first magnetic member 13, a non-magnetic member 14, and a second magnetic member 15 in this order in FIG. 1. The non-magnetic member 14 serves as a magnetically resistant member. The first magnetic member 13 is connected with the non-magnetic member 14 by welding such as laser welding or the like. The non-magnetic member 14 is connected with the second magnetic member 15 by welding such as laser welding or the like.

The non-magnetic member 14 restricts magnetic flux from short circuiting between the first magnetic member 13 and the second magnetic member 15. The valve body 16 is welded to and fixed in the first magnetic member 13 on the side of the nozzle hole 18a. The valve body 16 internally has a valve seat 17, on which the valve member 20 is capable of seating. A nozzle hole plate 18, which is in a cap shape, is fixed to the outer peripheral wall of the valve body 16 by welding or the like. The nozzle hole plate 18 is formed to be in a thin plate shape. The nozzle hole plate 18 has at least one nozzle hole 18a in the substantially center portion thereof.

The valve member 20 is in a hollow bottomed cylindrical shape. The valve member 20 defines a contact portion 21 on the bottom side of thereof, i.e., on the side of the nozzle hole 18a. The contact portion 21 is capable of seating onto the valve seat 17 formed in the valve body 16. When the contact portion 21 seats onto the valve seat 17, the nozzle hole 18a is plugged, so that injection of fuel is stopped. The movable core 22 is secured to the valve member 20 on the side opposite to the valve body 16 by welding or the like. The valve member 20 defines at least one of fuel hole 20a on the upstream side of the contact portion 21 such that the fuel hole 20a penetrates the sidewall of the valve member 20. Fuel flows into the valve member 20, and the fuel passes through the fuel hole 20a from the inside to the outside of the valve member 20. The fuel is introduced into a valve portion that is constructed of the contact portion 21 and the valve seat 17.

The fixed core 30 is formed to be in a cylindrical shape. The fixed core 30 is accommodated in the non-magnetic member 14 and the second magnetic member 15 of the cylindrical member 12 such that the fixed core 30 is secured to the cylindrical member 12 by welding, press-insertion, or the like. The fixed core 30 is provided to the side opposite to the valve body 16 relative to the movable core 22. The valve body 16 is arranged on one side of the direction, in which the valve member 20 reciprocates. The fixed core 30 opposes to the movable core 22. The fixed core 30 has a surface opposing to the movable core 22, and the surface of the fixed core 30 is applied with a non-magnetic material.

The spring 34 hooks to the adjusting pipe 32 on one side thereof, and hooks to the movable core 22 on the other side thereof. The spring 34 biases the movable core 22 and the valve member 20 in a direction, in which the valve member 20 seats onto the valve seat 17, that is, on the other side, in which the valve member 20 reciprocates. A magnetic member 40 is provided to the outer periphery of the coil 44 such that the magnetic member 40 magnetically connects the first magnetic member 13 with the second magnetic member 15. The fixed core 30, the movable core 22, the first magnetic member 13, the magnetic member 40, and the second magnetic member 15 construct a magnetic circuit.

The coil 44 is arranged around a spool 42 that is provided to the outer periphery of the cylindrical member 12. A resinous housing 50 covers the outer peripheries of the cylindrical member 12 and the coil 44. A terminal 52 is embedded in the resinous housing 50 such that the terminal electrically connects with the coil 44.

As shown in FIG. 2, the coil 44 has a winding 45 that is oblong or rectangular in cross section. Specifically, the axial section of the winding 45 is in an oblong shape. The winding 45 is wound to construct the coil 44 such that the long side of the axial section of the winding 45 is arranged along a center axis 60 of the coil 44. That is, the long side of the axial section of the winding 45 is arranged substantially in parallel with the center axis 60 of the coil 44.

Figure 2A:
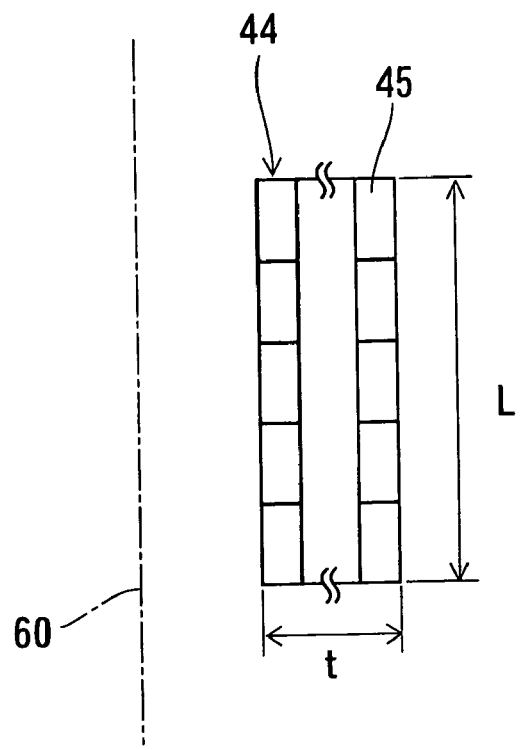
FIG. 2A is a schematic cross sectional side view showing a coil of the fuel injection valve.
Figure 2B:
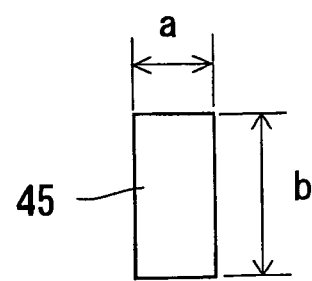
FIG. 2B is a schematic cross sectional side view showing a winding of the coil, according to the first embodiment.

As referred to FIG. 2B, the axial cross section of the winding 45 has the short side, which has the length (short side length) a, and the long side, which has the length (long side length) b. The length a and the length b are set such that the following relationship $1.1 \leq b/a \leq 25$ is satisfied. That is, the long side length b divided by the short side length a has a quotient that is equal to or greater than 1.1. The quotient of the long side length b divided by the short side length a is equal to or less than 25.

As referred to FIG. 2A, the coil 44 has the length (coil length) L along the center axis 60. The coil 44 has the thickness (coil thickness) t in the radial direction with respect to the center axis 60. The length L and the thickness t are set such that the following relationship $2 \leq L/t \leq 30$ is satisfied. That is, the coil length L divided by the coil thickness t has a quotient that is equal to or greater than 2. The quotient of the coil length L divided by the coil thickness t is equal to or less than 30.

As referred to FIG. 1, the fuel injection valve 10 has a cover portion 40a, which circumferentially covers the coil 44, having the outer diameter (cover outer diameter) D. The outer diameter D of the cover portion 40a of the fuel injection valve 10 and the length (coil length) L of the coil 44 are set such that the following relationship $0.9 \leq D/L \leq 2$ is satisfied. That is, the cover outer diameter D divided by the coil length L has a quotient that is equal to or greater than 0.9. The quotient of the cover outer diameter D divided by the coil length L is equal to or less than 2.

As referred to FIG. 1, fuel flows through the fuel passage 100 from the upward in FIG. 1. The fuel further passes through fuel passages, which are formed in the fixed core 30, the movable core 22, and the valve member 20. The fuel further passes through the fuel hole 20a and an opening, which is formed between the contact portion 21 and the valve seat 17 when the contact portion 21 lifts from the valve seat 17. Thus, the fuel is injected from the nozzle hole 18a.

In the above fuel injection valve 10, when the coil 44 is de-energized, the valve member 20 is biased by the spring 34 downwardly in FIG. 2. Specifically, the valve member 20 is biased in a valve-closing direction, in which the valve member 20 seats onto the valve seat 17 in this situation. Thus, the contact portion 21 of the valve member 20 seats onto the valve seat 17, so that the nozzle hole 18a is plugged and fuel injection is stopped.

When the coil 44 is energized, magnetic flux passes through the magnetic circuit that is constructed of the fixed core 30, the movable core 22, the first magnetic member 13, the magnetic member 40, and the second magnetic member 15. Thereby, the fixed core 30 and the movable core 22 generate magnetic attractive force therebetween. The valve member 20 and the movable core 22 moves to the side of the fixed core 30 against bias, i.e., resilience of the spring 34, so that the contact portion 21 of the valve member 20 lifts from the valve seat 17. Thus, fuel is injected from the nozzle hole 18a.

In this embodiment, the winding 45 is wound such that the long side of the axial section of the winding 45 is arranged along the center axis 60 of the coil 44. Thereby, the winding 45 is capable of being restricted from causing misalignment in the winding structure thereof. Besides, the structure of the winding 45 can be readily formed, compared with a structure in which the short side of the axial section of the winding 45 is arranged along the center axis 60.

In addition, the ratio between the length a and the length b are set in the wide range as $1.1 \leq b/a \leq 25$. Therefore, a winding having an appropriate aspect ratio b/a can be applied to various kinds of fuel injection valves having different shapes.

Furthermore, the aspect ratio b/a of the winding 45 is adjusted, so that the ratio between the length L and the thickness t of the coil 44 are capable of being set in the wide range as $2 \leq L/t \leq 30$. Besides, the axial cross section of the winding 45 is set to be a polygonal shape such as an oblong shape and a rectangular shape, so that the space factor of the winding 45 is enhanced, and the coil 44 is reduced in diameter. Therefore, the ratio between the outer diameter D of the cover portion 40a of the fuel injection valve 10 and the length L of the coil 44 is capable of being set to be in the small range as $0.9 \leq D/L \leq 2$. The cover portion 40a of the fuel injection valve 10 circumferentially covers the coil 44. Preferably, the ratio D/L is substantially equal to 1 for shortening the magnetic path and for reducing leakage of magnetic flux.

(Second Embodiment)

Figure 3:
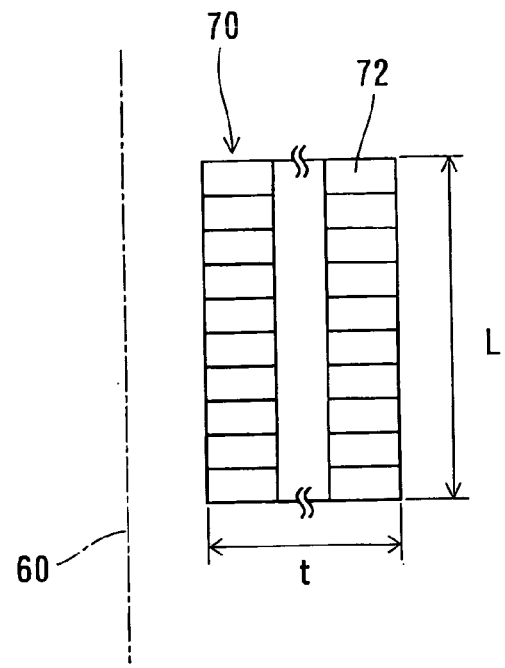
FIG. 3 is a schematic cross sectional side view showing a coil of the fuel injection valve, according to a second embodiment of the present invention.

As shown in FIG. 3, a winding 72 is wound to form a winding structure of a coil 70 such that the short side of the axial section of the winding 72 is arranged substantially along the center axis 60 of the coil 70. In this embodiment, the number of layers of the winding 72 relative to the radial direction of the coil 70 and the number of rows of the winding 72 relative to the axial direction of the coil 70 are capable of being adjusted within the number of turns, which is the same as that of the structure in the first embodiment. Thereby, the aspect ratio of the cross section of the winding 72 can be set as $1.1 \leq b/a \leq 25$, the ratio between the length L and the thickness t of the coil 44 can be set as $2 \leq L/t \leq 30$, and the ratio between the outer diameter D of the portion of the fuel injection valve 10 and the length L of the coil 44 can be set as $0.9 \leq D/L \leq 2$, similarly to the first embodiment.

(Third Embodiment)

Figure 4A:
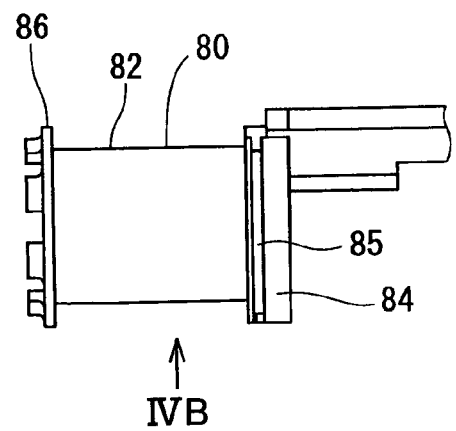
FIG. 4A is a side view showing a spool of a coil of the fuel injection valve.
Figure 4B:
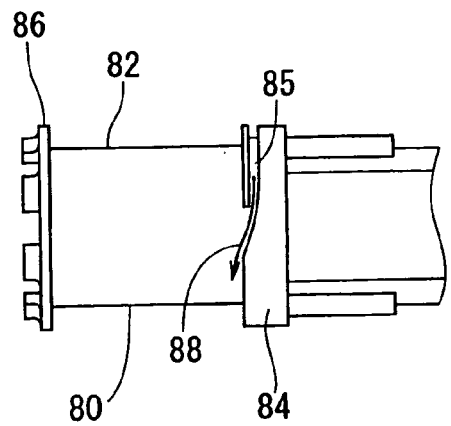
FIG. 4B is a view when being viewed from the arrow IVB in FIG. 4A, according to a third embodiment of the present invention.
Figure 5:
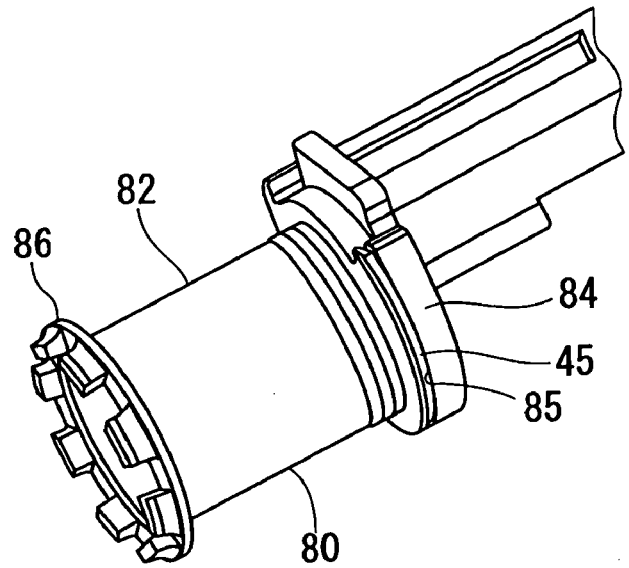
FIG. 5 is a perspective view showing the spool, according to the third embodiment.

As shown in FIGS. 4A, 4B, and 5, a spool 80 includes a cylindrical portion 82, first and second hooking portions 84, 86. A winding 45 of a coil is wound around the outer periphery of the cylindrical portion 82. The winding manner of the winding 45 in the coil and the shape of the winding 45 are equivalent to those in the first embodiment or the second embodiment. The winding may have at least one of various kinds of polygonal cross sections including a square shape, an oblong shape, and the rectangular shape. The first and second hooking portions 84, 86 radially outwardly expand respectively to be in annular shapes, such that the first and second hooking portions 84, 86 restrict the winding 45 from causing misalignment.

The first hooking portion 84 is arranged on the side, from which the winding 45 is wound. The first hooking portion 84 defines a guiding groove 85 that guides the winding 45 circumferentially along the outer periphery of the cylindrical portion 82. As referred to FIG. 4B, the winding 45 is wound along the guiding groove 85, as shown by an arrow 88, so that the winding 45 can be restricted from causing interference and overlapping relative to each other at the position, from which the winding 45 is wound. Thus, the winding 45 can be protected from causing misalignment in the winding structure thereof.

Figure 6:
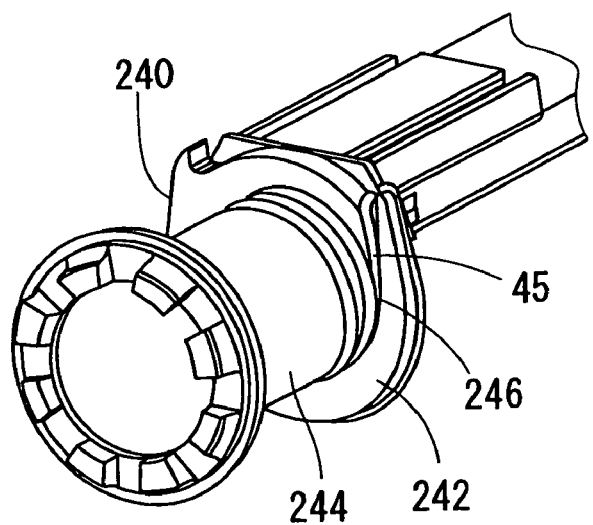
FIG. 6 is a perspective view showing a spool, according to a related art.

As shown in FIG. 6, in a spool 240 according to a related art, the guiding groove 85 is not provided to a hooking portion 242, from which the winding 45 is wound. In the spool 240, the winding 45 is directly wound around the outer circumferential periphery of a cylindrical portion 244 from the hooking portion 242. As a result, the winding 45 may cause interference and overlapping relative to each other at a winding beginning position 246. As a result, the winding 45 may cause misalignment in the winding structure thereof. When one misalignment structure is formed in the winding 45, another misalignment structure may be easily formed in the following winding process.

In each of the coils of the third embodiment and the related art, the winding 45 having a polygonal cross section such as an oblong cross section is wound to form the winding structure. In this winding structure, when a misalignment arises in the winding structure of the winding 45, edge portions of the rectangular (oblong) crosssectional winding 45 may make contact with reach other. Alternatively, an edge portion of the rectangular crosssectional winding 45 and a plane of the rectangular crosssectional winding 45 may make contact with reach other. As a result, the winding 45 may interfere relative to each other, and insulating coating on the winding 45 may be broken. Thus, the winding 45 may cause a short circuit therein.

However, in this embodiment, the guiding groove 85 is provided to the first hooking portion 84 on the side, from which the winding 45 is wound. Thereby, the winding 45 is protected from causing misalignment in the winding structure thereof, so that the winding 45 can be protected from causing a short circuit.

The guiding groove 85 may be provided to the second hooking portion 84, when the winding 45 is wound from the second hooking portion 84.

(Fourth Embodiment)

Figure 7:
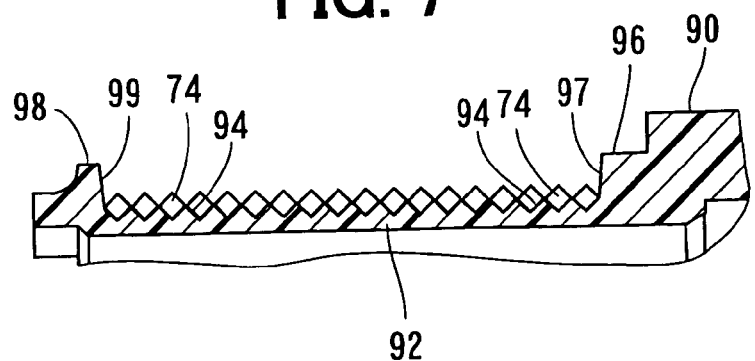
FIG. 7 is a cross sectional side view showing a spool, according to a fourth embodiment of the present invention.

As shown in FIG. 7, a winding 74 has an axial section, which is in a substantially square shape. A spool 90 includes a cylindrical member 92, first and second hooking portions 96, 98. A winding groove 94 is formed on the outer periphery of the cylindrical portion 92 in a direction, in which the winding 74 is wound from the first hooking portion 96 to the second hooking portion 98. The winding groove 94 extends from the first hooking portion 96 to the second hooking portion 98. The winding groove 94 has a substantially spiral shape. The hooking portion 96 is arranged on the side, from which the winding 74 is wound.

Specifically, the first hooking portion 96 is arranged on a first end of the cylindrical portion 92 to hook a first end of the winding 74 of the coil 44. The second hooking portion 98 is arranged on a second end of the cylindrical portion 92 to hook a second end of the winding 74 of the coil 44.

The winding groove 94 has an axial cross section, which is in a substantially V-shape that substantially coincides with the shape of one apex angular portion of the axial cross section of the winding 74.

Specifically, the winding groove 94 has an axial section that has a substantially V-shape, which opens at a groove opening angle. The winding 74 has the axial section that has an apex angular portion, which defines an apex angle. The groove opening angle of the winding groove 94 substantially coincides with the apex angle of the winding 74.

For example, the apex angular portion of the axial cross section of the winding groove 94 opens at substantially 90°. The axial cross section of the winding groove 94 has two sides. Each of the sides of the axial cross section of the winding groove 94 has the length that is substantially the same as the length of one side of the substantially squared axial section of the winding 74. The first and second hooking portions 96, 98 respectively have side surfaces 97, 99 on the sides of the coil. The side surfaces 97, 99 are respectively tapered inclining toward the coil from the radially outer side thereof to the radially inner side thereof. Specifically, the side surfaces 97, 99 open widely to the radially outer side.

In this embodiment, the winding 74 is wound while being guided by the winding groove 94 such that the winding 74 makes contact with the outer periphery of the cylindrical portion 92. Thereby, variation in inclination of the winding 74, which is wound around the outer periphery of the cylindrical portion 92, can be reduced, and the winding 74 can be restricted from causing misalignment in the winding structure. The winding 74 is wound around the cylindrical portion 92, so that the winding 74 forms a first layer in the winding structure. The first layer of the winding 74 has the radially outer periphery that has a shape substantially the same as the shape of the radially outer periphery of the winding groove 94. Thereby, misalignment can be restricted from arising in the second layer and other following layers in the winding structure of the winding 74.

Furthermore, the winding 74 is wound along the inclining side surfaces 97, 99 of the hooking portions 96, 98, so that the position of the winding 74 may not vary in the winding structure at the hooking portions 96, 98. Therefore, the winding 74 can be protected from causing misalignment in the winding structure around the hooking portions 96, 98.

As described above, the winding 74 is protected from causing misalignment around the hooking portions 96, 98 and the cylindrical portion 92, so that the winding 74 can be protected from causing a short circuit due to interference therein and/or due to scratching each other in the winding structure.

(Fifth Embodiment)

Figure 8:
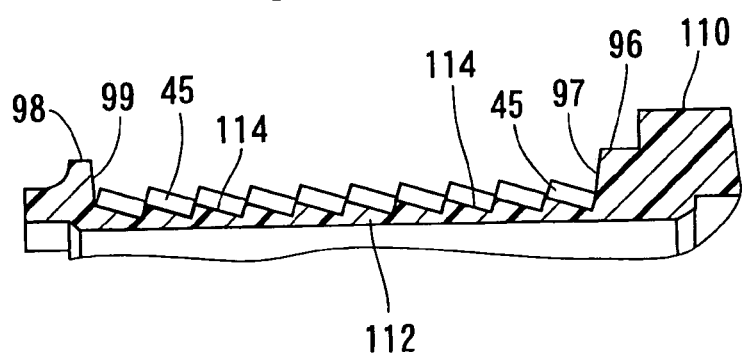
FIG. 8 is a cross sectional side view showing a spool, according to a fifth embodiment of the present invention.

As shown in FIG. 8, the winding 45 has the axial section, which is in a rectangular (oblong) shape similarly to the first embodiment. A spool 110 has a cylindrical portion 112 that has the radially outer periphery, on which a winding groove 114 is formed in a spiral shape. The winding groove 114 is formed in a winding direction, in which the winding 45 is wound from the first hooking portion 96 to the second hooking portion 98. The winding groove 114 has an axial section that is in a substantially V-shape that substantially coincides with the shape of one apex angular portion of the axial cross section of the winding 45. That is, the outer periphery of the winding 45 substantially engages with the winding groove 114. The apex angular portion of the axial cross section of the winding groove 114 opens at a groove opening angle such as substantially 90°. The axial cross section of the winding groove 114 has two sides. One of the two sides of the axial cross section of the winding groove 114 has the length that is substantially the same as the length of the long side of the substantially rectangular (oblong) axial section of the winding 45. The other one of the two sides has the length that is smaller than the length of the short side of the substantially rectangular axial section of the winding 45.

The winding 45 is wound around the winding groove 114 having the above structure, so that variation in inclination of the winding 45 around the cylindrical portion 112 can be reduced, and the winding 45 can be restricted from causing misalignment in the winding structure.

The winding 45 is wound around the cylindrical portion 112, so that the winding 45 forms a first layer in the winding structure. The first layer of the winding 45 has the outer periphery that has a shape substantially the same as the shape of the outer periphery of the winding groove 114 relative to the radial direction of the cylindrical portion 112. Thereby, misalignment can be restricted from arising in the second layer and following layers in the winding structure of the winding 45. Thereby, the winding 45 can be protected from causing a short circuit due to interference therein and/or due to scratching each other in the winding structure.

(Sixth Embodiment)

Figure 9:
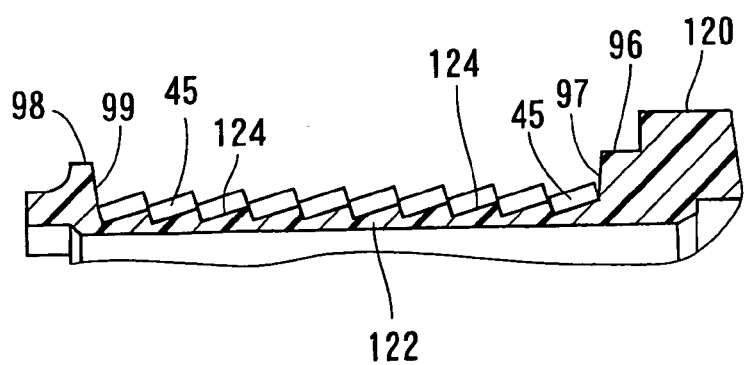
FIG. 9 is a cross sectional side view showing a spool, according to a sixth embodiment of the present invention.

As shown in FIG. 9, a winding groove 124 is formed in the outer periphery of a cylindrical portion 122 of a spool 120. The winding groove 124 has a shape that is formed such that the shape of the winding groove 114 in the fifth embodiment is flipped. Specifically, the shape of the winding groove 114 in the fifth embodiment is inverted with respect to the substantially axial center of the cylindrical portion 122, so that the winding groove 124 is formed. Even in this structure, an effect that is substantially the same as that in the fifth embodiment can be produced.

In the above embodiments, the axial section of each winding is set to be a polygonal shape such as a substantially square and a substantially rectangular (oblong). In this winding structure, a gap formed between wires arranged to be adjacent to each other can be reduced, compared with the winding structure, in which the wire has a circular axial section. Thus, the space factor in the winding structure can be enhanced.

In this winding structure, at least one of the outer diameter and the axial length of the coil can be reduced when the number of turns is the same as a winding structure, in which the wire has a circular axial cross section. Therefore, the magnetic path, through which magnetic flux generated using the coil passes, becomes small, so that leakage of magnetic flux can be reduced, and magnetic force, which attracts the movable core 22 toward the fixed core 30 can be increased. Thus, response of opening the valve can be enhanced. In this structure, magnetic force between the fixed core 30 and the movable core 22 can be enhanced. Therefore, response of both opening and closing the valve can be enhanced by increasing resilience of the spring 43 such that the response of opening the valve is not significantly degraded.

In this winding structure, at least one of the outer diameter and the axial length of the coil can be reduced, so that the fuel injection valve can be small sized. Therefore, the fuel injection valve can be mounted in a narrow space. For example, an engine may have a structure, in which an intake port is arranged to be vertical with respect to a combustion chamber to reduce inhalation resistance of intake air flowing from an intake pipe into a combustion chamber. In this structure, a space, in which the fuel injection valve is arranged, may become small. However, even in this structure, the fuel injection valve including the small-diameter coil, in which the winding having a polygonal cross section is wound, can be mounted to a narrow space.

(Modified Embodiment)

The relationship between the length a and the length b of the winding is not limited to the above-described $1.1 \leq b/a \leq 25$, the relationship between the length L and the thickness t of the coil is not limited to the above-described $2 \leq L/t \leq 30$, and the relationship between the outer diameter D of the portion of the fuel injection valve 10 and the length L of the coil 44 is not limited to the above-described $0.9 \leq D/L \leq 2$, when the winding has a substantially rectangular (oblong) axial section. The structure of the winding and the coil are not limited to the above structure when the winding has a substantially rectangular (oblong) axial section.

The axial section of the winding is not limited to the substantially square shape and the substantially rectangular shape. The axial section of the winding may be a triangular shape, an oblong shape other than the substantially square and the rectangular shape, and another polygonal shape. The polygonal shape is not limited to a substantially regular polygonal shape. The winding having a polygonal axial section is wound in a coil, so that gaps formed in the winding structure of the coil become small, compared with a winding structure, in which a circular axial sectional winding is used. Thereby, the space factor in the winding structure can be enhanced. As a result, the fuel injection valve can be reduced in size, and the magnetic path, through which magnetic flux generated using the coil, can be shortened, so that response of opening the valve can be enhanced. Therefore, even when the axial section of the winding is a polygonal shape other than a substantially oblong axial section, the relationship between the outer diameter D of the portion of the fuel injection valve 10 and the length L of the coil 44 can be within the range 0.9≦D/L≦2.

In the above embodiments, the windings respectively have polygonal axial sections. Therefore, the windings may cause scratching around the edge portions of the polygonal axial sections, and may brake electrically insulative coatings thereof. However, in the structures of the above embodiments, the polygonal cross sectional windings are arranged substantially in regular manners, so that the polygonal cross sectional windings can be restricted from causing a short circuit therein due to interference and scratching.

When the winding groove can engage with the apex angular portion of the axial cross section of the winding, and can guide the winding in the winding direction, the opening angle of the substantially V-shaped axial section of the winding groove may be larger or may be smaller than the angle of apex portion of the axial section of the winding. The axial section of the winding is not limited to be in the V-shape, and may be in another shape such as an arc shape.

In the above fourth, fifth, and sixth embodiments, the winding groove is preferably formed continuously in a spiral shape from the one hooking portion to the other hooking portion of the spool. However, the winding grove may be circumferentially discontinuous at a portion, in which forming dies engage with each other when the spool is molded in the forming dies.

Both the sidewalls of the hooking portions may be inclined on the side of the coil as described above. Alternatively, one of the sidewalls of the hooking portions may be inclined on the side of the coil.

The structures and methods of the above embodiments can be combined as appropriate.

Various modifications and alternations may be diversely made to the above embodiments without departing from the spirit of the present invention.

What is claimed is:

1. A fuel injection valve comprising:
   a valve member that opens and closes a nozzle hole;
   a movable core that axially reciprocates with the valve member;
   a fixed core that is arranged on a side opposite to the nozzle hole with respect to the movable core, the fixed core opposing to the movable core;
   a coil that generates magnetic force, which attracts the movable core toward the fixed core when the coil is energized, wherein the coil includes a winding, and the winding of the coil has an axial section, which is in a polygonal shape; and
   a spool that includes a cylindrical portion, a first hooking portion, and a second hooking portion,
   wherein the winding is wound around the cylindrical portion of the spool,
   the first hooking portion is arranged on a first end of the cylindrical portion to hook a first end of the coil,
   the second hooking portion is arranged on a second end of the cylindrical portion to hook a second end of the coil,
   one of the first hooking portion and the second hooking portion is arranged on a side, from which the winding of the coil is wound,
   the one of the first hooking portion and the second hooking portion defines a guiding groove that guides the winding to an outer periphery of the cylindrical portion along a substantially circumferential direction of the cylindrical portion, and
   the guiding groove is radially inclined in said substantially circumferential direction toward the cylindrical portion.

2. The injection valve according to claim 1, wherein the axial section of the winding is in a substantially oblong shape.

3. The injection valve according to claim 1, wherein the axial section of the winding is in a substantially rectangular shape.

4. The injection valve according to claim 3, wherein the axial section of the winding has a long side that is arranged substantially along a center axis of the coil.

5. The injection valve according to claim 3,
   wherein the axial cross section of the winding has a short side, which has a short side length,
   the axial cross section of the winding has a long side, which has a long side length,
   the long side length divided by the short side length has a quotient that is equal to or greater than 1.1, and
   the quotient of the long side length divided by the short side length is equal to or less than 25.

6. The injection valve according to claim 5,
   wherein the coil has a coil length along the center axis of the coil,
   the coil has a coil thickness in a radial direction of the coil,
   the coil length divided by the coil thickness has a quotient that is equal to or greater than 2, and
   the quotient of the coil length divided by the coil thickness is equal to or less than 30.

7. The injection valve according to claim 1, further comprising:
   a cover portion that circumferentially covers the coil,
   wherein the cover portion has a cover outer diameter,
   the coil has a coil length along a center axis of the coil,
   the cover outer diameter divided by the coil length has a quotient that is equal to or greater than 0.9, and
   the quotient of the cover outer diameter divided by the coil length is equal to or less than 2.

8. The injection valve according to claim 1,
   wherein at least one of the first hooking portion and the second hooking portion has a side surface that makes contact with the coil, and
   the side surface inclines toward a side of the coil from a radially outer side of the side surface to the radially inner side of the side surface.

9. The injection valve according to claim 1,
   wherein the cylindrical portion has an outer periphery that defines a winding groove, which guides the winding, and
   the winding groove extends from the first hooking portion to the second hooking portion.

10. The injection valve according to claim 9,
    wherein the winding groove has an axial section that has a substantially V-shape, which opens at a groove opening angle, the winding has an axial section that has an apex angular portion, which defines an apex angle, and the groove opening angle of the winding groove substantially coincides with the apex angle of the winding.

11. The injection valve according to claim 1, wherein the guiding groove is inclined with respect to an axial direction of the spool toward the other of the first hooking portion and the second hooking portion.

12. The injection valve according to claim 1, further comprising a winding groove defined on the outer circumference of the cylindrical portion for receiving the winding.

* * * * *